Oct. 8, 1957  G. J. KRASL  2,809,100
COMBUSTION ANALYZER
Filed May 12, 1951
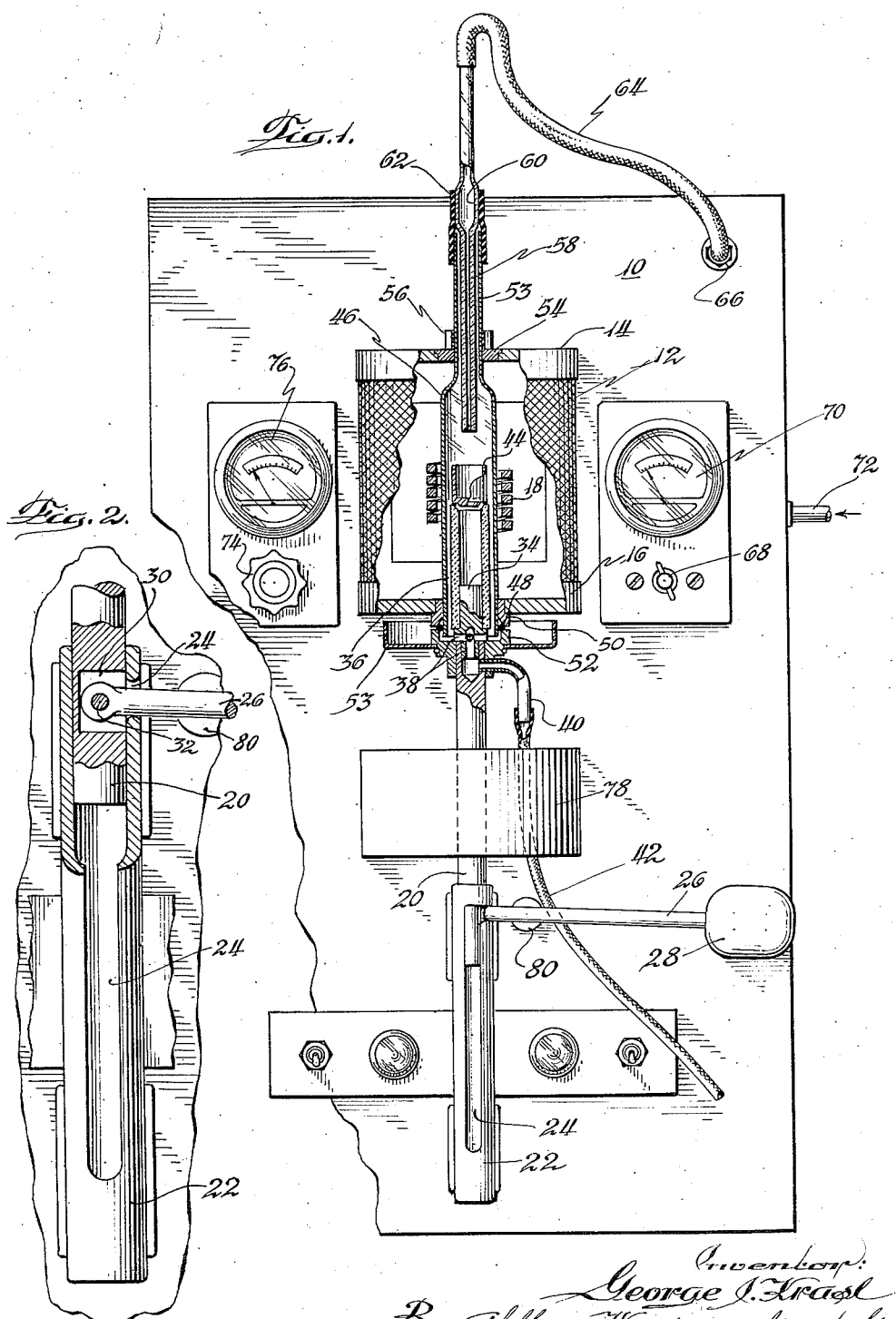

United States Patent Office 2,809,100
Patented Oct. 8, 1957

2,809,100

COMBUSTION ANALYZER

George J. Krasl, St. Joseph, Mich., assignor to Laboratory Equipment Corporation, St. Joseph, Mich., a corporation of Michigan Application May 12, 1951, Serial No. 226,017

1 Claim. (Cl. 23—253)

The present invention relates to combustion analyzers and methods of analysis and is concerned more particularly with the quantitative chemical determination of certain substances in metals such as carbon in steel for instance.

During some manufacturing and metallurgical processes, it is necessary to determine certain constituents, for instance carbon in steel or similar materials, rather quickly and accurately. The present apparatus is particularly adapted for this purpose when the analysis procedure can be based upon combustion of a sample to be tested and subsequent analysis of the resulting gas with or without further treatment. Although its principal utility is for the determination of the carbon content in steel, iron, and materials known as high density alloys, the apparatus and method can be used for other purposes with slight modification in the procedure. The invention, however, will be described in connection with a specific method and apparatus for the determination of carbon in iron, steel, ferro-chrome, tungsten carbide and the like.

In general in combustion analysis methods, a small weighed quantity of steel to be tested for carbon is burned in the presence of oxygen and the resulting gas is drawn or forced into analyzing apparatus for the determination of its carbon dioxide content. The actual gas analyzing apparatus which receives the products of combustion may be the familiar Orsat type gas analyzer which is well known and forms no part of the present invention and, therefore, need not be specifically described. It operates upon the principle of measuring the volume of the products of combustion, then absorbing the carbon dioxide therein, usually in a potassium hydroxide solution, and comparing the quantity of gas less the carbon dioxide with the original sample. More specifically, therefore, the apparatus of the present invention may be considered as being for the purpose of receiving a sample of steel or similar material to be tested and operating to convert this sample into products of combustion which are suitable for analysis by an Orsat or equivalent type analyzer.

One of the objects of the present invention is to provide an improved method and apparatus for converting a sample of steel or other material into products of combustion extremely quickly and at very high temperatures so that a quantitative determination may be carried out within an extremely short space of time.

Yet another object is to provide novel apparatus for accomplishing the above with a minimum quantity of oxygen so that the total quantity of gases, which include all of the products of combustion and an excess of oxygen will occupy a minimum space, thereby not overtaxing the capacity of the Orsat or other analyzer.

Still another object is to provide an improved combustion method and apparatus for practicing the above method which is reliable and which may be used with facility by technicians with a minimum of training.

Yet another object is to provide an apparatus and method for accomplishing the combustion of substances which are not easily burned such as tungsten carbide, for instance.

Other objects and advantages will become apparent from the following description of a preferred embodiment of my invention which is illustrated in the accompanying drawings.

In the drawings:

Figure 1 is a front view of one type of combustion apparatus embodying the present invention with portions of the structure broken away so as to reveal details of the operating mechanism in greater clarity.

Figure 2 is an enlarged fractional view of a portion of the elevating and locking mechanism shown partly in section.

The customary practice in chemical analysis procedures for the determination of carbon which is based upon combustion is to burn the sample in the presence of oxygen and then to pass the products of combustion to suitable quantitative testing apparatus, such as an Orsat analyzer for instance, where the quantity of the carbon dioxide in the mixture can be determined. If the combustion is complete, the quantity of carbon dioxide, therefore, will be representative of the quantity of carbon in the original sample. Although carbon and carbon dioxide have been used as examples, it will be appreciated that essentially the same process with minor changes can be used for the determination of other substances. For instance, sulphur may be similarly determined after combustion by measuring the quantity of sulphur dioxide produced, and so on.

When the above analysis method is applied to steel, it is customary to put the steel sample in a small ceramic boat which is then placed in a tube, usually in a horizontal position. The tube is then heated, usually in an electric furnace while oxygen is caused to flow through the tube and over and around the boat so as to come into contact with the sample. This process is continued until the sample is entirely consumed and the resulting gas is then tested for carbon dioxide. This method of procedure is quite slow according to the standards of the present invention, particularly with certain substances such as ferro-chrome, ferro-tungsten and the like unless the temperature of the furnace is raised to a point where equipment replacement cost is excessive. Since an Orsat analyzer of standard size is limited as to the quantity of gas it will contain, it sometimes takes considerable skill, particularly with certain materials, to regulate the flow of oxygen and the temperature in such fashion as to insure complete combustion of the carbon in the sample without exceeding the gas capacity of the Orsat analyzer while at the same time insuring a reasonably useful life for the equipment.

The device of the present invention which overcomes the above disadvantages is made up of a rectangular cabinet, the front panel of which is indicated at 10. Well up toward the top of this panel and centrally positioned is a semi-cylindrical convex cage 12 made up of heavy screen wire, expanded metal or the like which has flat top and bottom closure members 14 and 16 respectively. An induction heating coil 18 with its axis vertical is disposed within the cage 12 and acts as the heater for the sample to be tested. This coil 18 is formed of a shaped copper bar, for instance, and is self-supporting with the turns of the coil air spaced. Its ends are secured to the cabinet panel 10 and are electrically connected to an oscillator circuit within the cabinet so that a high frequency current of considerable intensity can be passed through the coil, thereby subjecting any substance within the coil to a strong induction field. Such induction heating devices are old for other heating purposes and the circuit for energizing the coil 18, therefore, needs no specific description since it may be any standard circuit of appropriate capacity employed for induction heating.

In a position below the coil 18 and axially aligned therewith is a pedestal 20 formed of steel or like material which can slide upwardly and downwardly within a tube 22 secured to the panel 10. This tube is equipped with an L-shaped bayonet slot 24, the major portion of which extends vertically. At its upper end the slot 24 extends circumferentially toward the right for a short distance and at its extreme end drops downwardly slightly. A handle 26 which is disposed in a generally horizontal position is weighted at its outward end as by the mass indicated at 28 which may have any suitable value; in the present instance approximately one pound has been found satisfactory. The inner end of the handle 26 extends through the slot 24 and into a recess 30 formed in the pedestal 20 a short distance above its lower end. Within this recess the end of the handle is pivoted to the pedestal by a cross pin 32 which is horizontally disposed. The outer end of the handle 26, therefore, is free to rock upwardly and downwardly a small amount but cannot move very far either upwardly or downwardly without carrying the pedestal 20 along with it. This construction is for the purpose of raising and lowering the pedestal and automatically sealing the upper end against a gasket in a manner to be described in greater detail presently.

At its upper end, the pedestal 20 carries a steel peg 34 or the equivalent, the upper portion of which is cylindrical and fits within the lower end of a cylindrical ceramic sleeve 36. The pedestal beneath the peg and a portion of the peg are drilled or otherwise formed to provide interconnecting passages 38 which connect the space around the ceramic sleeve 36 with a fitting 40 affixed to the pedestal near its upper end. This fitting is in turn connected to a flexible tube 42 leading to an Orsat or equivalent analyzer by way of a sulfur trap and carbon monoxide oxidizer if required.

The upper end of the ceramic sleeve 36 is adapted to receive a small ceramic crucible 44 which is to contain the sample to be tested. When the pedestal 20 is in its uppermost position, this crucible is brought within the field of the induction coil 18 so that when the coil is energized the sample will be heated rapidly to a high temperature. The sleeve 36 and the ceramic crucible 44 are enclosed within a high temperature resisting glass or fused quartz tube 46 which extends downwardly from the upper cover member 14 with its wall passing through the annular space between the coil 18 on the one hand and the crucible 44 and sleeve 36 on the other hand. The lower end of this tube is fitted exteriorly with a resilient ring 48 formed of rubber or similar material which when the pedestal is in the uppermost position is clamped so as to form an airtight seal between a flange 50 secured to the lower closure plate 16 and a similar flange 52 carried by the upper end of the pedestal 20. A generally circular pan 53 with an upturned edge is also carried by the flange 52 and serves to catch the crucible if it accidentally falls from the top of the sleeve 36.

At its upper end the combustion tube 46 has a stem portion 53 of smaller diameter which passes through an opening in an adapter ring 54 received in a circular stepped opening in the cover member 14. The adapter ring is not necessary, but is useful since it may be advisable to use combustion tubes 46 of different size and type for different purposes. Also, of course, it facilitates removal and insertion of the combustion tube through the top cover 14 if desired. The tube 46 is prevented from slipping downwardly by a spring clamp 56 of any suitable type which grips the stem portion 53 in a position just above the adapter ring 54. Lateral movement of the tube is prevented by the adapter ring at the top, the lower end of the combustion tube being confined within an opening through the flange 50.

A jet forming tube 58 formed of fused quartz or high temperature resisting glass having a comparatively small bore opening extends downwardly through the stem 53 of the combustion tube 46 so that its lower end is positioned a short distance above and centered over the crucible 44. In a position just above the upper end of the combustion tube 46, the jet forming tube 58 is blown to have an enlargement 60 with approximately the same external diameter as has the upper end of the combustion tube 46. This enlargement prevents the jet tube from slipping downwardly within the combustion tube. The jet tube and combustion tube are sealed together in airtight relation by a short length of rubber tubing 62 which is slipped over the enlargement 60 of the jet tube and the upper end of the combustion tube.

The upper end of the jet tube is in turn connected by a length of flexible tubing 64 with a fitting 66 upon the front panel 10 of the analyzer. Behind the panel, the fitting 66 is connected through a flow control valve 68 to a fitting 72 at the side of the cabinet. This last fitting is connected by flexible tubing or otherwise to a source of oxygen not shown.

Although it needs no special discussion since suitable controls are well known, the electronic circuit for energizing the coil 18 is controlled by a knob 74 located upon the front of the cabinet and in order to aid the operator in adjusting the device, the plate current and grid current can be determined from the meters 70 and 76, respectively.

In order to make a determination with this apparatus and according to this method, a sample to be tested is weighed (it may be either in the form of a slug or drillings) and this sample is placed in the crucible 44. At this time the handle 26 rests against the lower end of the slot 24 with the weight 28 extending straight outwardly away from the cabinet face 10. In this position the top end of the sleeve 36 is approximately flush with the top edge of a half-cylindrical shield 78 which is secured to the panel 10 and deflects the crucible into the pan 53 if the crucible is accidentally upset. The crucible 44 with the sample therein is then set upon the upper end of the sleeve 36, the oxygen is turned on and the crucible elevated to the heating position.

Elevation is accomplished by placing one hand beneath the handle 26 and lifting straight upwardly until the handle comes against the upper end of the bayonet slot 24. The handle is then swung to one side until it reaches the end of the horizontal portion of the bayonet slot and is then lowered and the hand removed.

As will be seen in Fig. 2, this causes the lower surface of the handle 26 to be brought against the lower edge of the horizontal portion of the slot 24 a short distance to one side of the pivot point 32. The result is that as the weight 28 is lowered its rocks the pivot pin 32 upwardly somewhat so as to seal the flanges 50 and 52 against the resilient gasket 48 in an airtight manner. Since the length of the handle 26 from the weight to the edge of the slot 24 is long as compared to the distance between this slot edge and the pivot pin 32, the upward camming action on the pedestal 20 will be considerable and will always be the same. On the other hand, even though the sealing force brought against the gasket 48 is high, nevertheless the operator is required simply to lift the weight 28 and pedestal into place and then permit the weight to settle. Conversely when it is desired to open the apparatus to remove the crucible 44, it is merely necessary to grasp the weight 28 or handle 26 and lift it slightly and then rotate it forwardly and permit the pedestal and weight to be lowered until the handle 26 strikes the lower end of the slot 24.

A control push button 80 is mounted upon the front of the panel directly behind the position taken by the handle 26 when it has been raised to seal the apparatus for a combustion determination. This button is of such a length and is so located that when the handle 26 is rotated into the latched position and is generally parallel to the front 10 of the cabinet, the handle 26 will strike the button 80 and depress it, energizing the induction coil 18. The result is that as soon as the flanges 50 and 52 and tube 46 have been sealed against the gasket 48, at which time the crucible 44 has been elevated into the field of the induction coil 18, this coil will be energized and oxygen will be supplied through the jet tube 58 so as to blow against the sample in the crucible 44 at high velocity. Through operation of the induction coil 18, the sample in the crucible is brought to ignition temperature in a matter of a few seconds and will burn extremely rapidly at high temperature in the jet of oxygen. The action is quite violent by ordinary standards and there may be some spattering, but the gas turbulence within the apparatus is so great and the temperature so high that the spatter particles burn up within the combination zone almost instantaneously. The gaseous products of combustion contain all of the carbon mostly in the form of carbon dioxide although some carbon monoxide may be formed. The latter is easily converted to carbon dioxide as will appear presently.

The combustion of iron in oxygen has an exothermic reaction and because of the high rate at which oxygen is supplied locally to the surface of the sample by the jet, combustion is so rapid that the heat of the reaction itself raises the temperature of the sample considerably above that achieved by the currently used method of burning the sample in a boat placed in a tube through which oxygen is flowing relatively slowly. This higher temperature has the desirable effect of largely eliminating certain deleterious side reactions which are sometimes produced by too low a combustion temperature. The high temperature achieved also permits rapid determinations on such difficult to oxidize substances as ferro-chrome, ferro-tungsten, tungsten carbide and like materials commonly known as high density alloys.

I have found that probably because of the great turbulence of the reaction and the higher temperature, the quantity of oxygen necessary for completing combustion of the sample is considerably less than is normally required and that, therefore, there is no difficulty in achieving complete combustion well within the size limitations of standard Orsat analyzers usually used for combustion analysis even when determinations are made on high density alloys. The result is that less skill is required in regulating the oxygen supply than is normally the case, since wide divergence from the optimum gas rate will not affect the determination, and even though an excessive quantity of oxygen is used, there still will be space for it in the Orsat analyzer.

Because carbon monoxide may be present in the products of combustion, these products are passed through a U tube containing ceramic particles upon which copper oxide is deposited. The tube is heated by a furnace to about 1000 degrees F. so that all of the carbon monoxide in the gas mixture is converted to carbon dioxide before arriving at the Orsat analyzer. If desirable, the gases may also pass through the usual sulfur trap so as to remove any sulfur oxides that may be present.

Although I have described my invention in connection with a preferred embodiment thereof, it will be appreciated that changes may be made in the apparatus shown without exceeding the scope of the invention. It will be appreciated also that although the apparatus and method have been described in connection with the determination of carbon in steel and similar substances, the apparatus is adaptable for other determinations based upon the combustion phenomenon and that, therefore, the scope of the invention is to be determined by the accompanying claim.

I claim:

In combination apparatus for chemical analysis, means forming a support for a sample to be tested, elevating means for raising said support from a loading position to a combustion position, latching means for retaining said support in said combustion position, an induction heating coil positioned to surround said sample when said sample is in the combustion position, means forming an enclosure for said sample when said sample is in the combustion position, said induction coil being disposed exteriorly and closely adjacent to said enclosure, said enclosure having an opening in the bottom thereof through which said sample is elevated to the combustion position, closure means carried by said support to seal said opening when said support is elevated to the combustion position, small bore jet forming means in said enclosure disposed substantially vertically above said sample combustion position, means for supplying said jet forming means with a combustion gas under pressure, said jet forming means being oriented with the outlet bore thereof pointed downwardly directly toward the central portion of said combustion position of said sample to direct a high velocity jet of combustion gas directly against a sample on said support when said support is in the combustion position, and passage forming means connected to said enclosure to conduct the products of combustion from said enclosure.

References Cited in the file of this patent

UNITED STATES PATENTS

| | | |
|---|---|---|
| 773,529 | Seward | Oct. 25, 1904 |
| 2,072,791 | Baer | Mar. 2, 1937 |
| 2,224,044 | Francis et al. | Dec. 3, 1940 |
| 2,332,943 | Sobers | Oct. 26, 1943 |
| 2,336,075 | Derge | Dec. 7, 1943 |
| 2,382,301 | Dreher | Aug. 14, 1945 |
| 2,424,376 | Weikel | July 22, 1947 |

FOREIGN PATENTS

| | | |
|---|---|---|
| 47,666 | Norway | Mar. 17, 1930 |

OTHER REFERENCES

Rodden: "Analytical Chemistry of the Manhattan Project," 1st ed., pages 653–661, McGraw-Hill Book Co., Inc., New York, N. Y.; copyright 1950.

Smith et al.: "Industrial and Engineering Chemistry," Analytical Edition, vol. 2, 1930, pages 36–38.